Patented July 31, 1945

2,380,703

UNITED STATES PATENT OFFICE 2,380,703

ALUMINUM CHLORIDE CATALYST

Charles W. Montgomery, Oakmont, and Norman W. Franke, Penn Township, Allegheny County, Pa., assignors to Gulf Research & Development Company, Pittsburgh, Pa., a corporation of Delaware No Drawing. Application December 21, 1942, Serial No. 469,708

3 Claims. (Cl. 252—225)

This invention relates to an improved aluminum chloride catalyst and it is particularly concerned with a solid aluminum chloride catalyst having improved properties for use in the treatment of hydrocarbon compounds, and its method of production.

Aluminum chloride catalysts in various forms have been extensively used in the production of a large number of organic compounds and particularly in the treatment of hydrocarbons such as petroleum hydrocarbons to form other hydrocarbons for example by cracking, isomerization, alkylation and the like. In these processes both liquid and solid aluminum chloride catalysts have been used. Solid aluminum chloride catalysts are particularly useful in processes in which the reaction is carried out in the vapor phase. However, various difficulties have been encountered in connection with the solid aluminum chloride catalysts heretofore used which limit the useful life of such catalysts.

It is usually desirable in the aluminum chloride catalyst processes that a relatively pure grade of anhydrous aluminum chloride be used. Pure anhydrous aluminum chloride is usually available commercially in a finely divided state. This finely divided aluminum chloride is difficult to handle and does not produce satisfactory results in many commercial catalytic processes. Accordingly various types of catalysts in which finely divided aluminum chloride has been agglomerated by fusion have been used. These catalysts are of two general types, lump aluminum chloride obtained by breaking up solidified fused masses of aluminum chloride, and aluminum chloride distributed on the surface of a carrier such as pumice or an adsorbent material such as activated charcoal.

Each of these solid fused aluminum chloride catalysts has its own drawbacks. It is characteristic of aluminum chloride to form sludges with hydrocarbons, particularly unsaturated hydrocarbons, and when sludge forms a coating over the surfaces of lump aluminum chloride it prevents contact of the reactants with the catalyst and thus the catalytic activity of the catalyst is lost. The same is true of aluminum chloride supported on a carrier, particularly an adsorbent carrier such as activated charcoal. The adsorbent properties of the carrier cause the aluminum chloride-hydrocarbon reaction product to be adsorbed and retained in the pores of the catalyst. This type of catalyst is also subject to the difficulty that the coating of catalyst on the carrier is usually quite thin and because the aluminum chloride tends to sublime at the elevated temperatures usually used, the aluminum chloride coating is often rapidly dissipated into the gas stream and the activity of the catalyst is lost.

It is an object of the present invention to provide a solid aluminum chloride catalyst having an improved catalytic life.

It is also an object of this invention to provide a solid aluminum chloride catalyst in lump form having good compression strength which does not readily lose its catalytic activity.

It is more specifically an object of this invention to provide an improved lump aluminum chloride catalyst having a substantially reduced tendency to form sludge with hydrocarbons.

Another object of this invention is to provide a method of producing the improved lump aluminum chloride catalyst of the invention.

We have found that when substantially pure anhydrous aluminum chloride is fused under a superatmospheric pressure of hydrogen chloride a substantial amount of hydrogen chloride is taken up by the aluminum chloride by adsorption, solution or some similar phenomenon and that upon cooling the fused aluminum chloride until it solidifies, while maintaining a superatmospheric pressure of hydrogen chloride, the hydrogen chloride is retained in the aluminum chloride and there is obtained a solid aluminum chloride containing a substantial amount of hydrogen chloride. We have further found that this product has good mechanical strength and may be advantageously used in lump form as a catalyst in permeable beds or columns and it is particularly advantageous as a catalyst for use in the modification of hydrocarbons such as petroleum hydrocarbons, because it has the property of forming much less sludge with the hydrocarbons than is normally the case with a solid aluminum chloride catalyst.

The catalytic activity of the solid aluminum chloride-hydrogen chloride product of my invention is slightly lower than that of plain solid aluminum chloride. However, in view of the markedly reduced tendency to sludge formation its use is highly advantageous because less of the hydrocarbon feed is wasted in sludge formation and further because the useful life of the catalyst is substantially increased. The sludge formation is sufficiently slow and the lump catalyst is sufficiently non-absorbent so that the sludge drains off the lumps as fast as it forms and the catalyst does not become coated with sludge. Consequently the catalyst does not lose its catalytic activity due to the sludge formation but may be used effectively over long periods of time. In most cases the useful life of the catalyst is limited only by the size of the lumps. As sludge is formed and drains away the lumps are gradually reduced in size, thus gradually reducing the amount of catalyst in the bed.

In preparing the solid aluminum chloride-hydrogen chloride catalyst of my invention the aluminum chloride, advantageously a substantially pure anhydrous aluminum chloride is heated in a pressure vessel such as an autoclave, bomb or the like to a temperature sufficient to effect substantially complete fusion, under a pressure of hydrogen chloride greater than the vapor pressure of aluminum chloride at the temperature of fusion. Hydrogen chloride gas is introduced into the pressure vessel in direct contact with the aluminum chloride, advantageously under a superatmospheric pressure. In most cases we have found it desirable to introduce the hydrogen chloride under pressure prior to effecting heating of the pressure vessel so that substantially higher hydrogen chloride pressures are obtained at the temperature of fusion of the aluminum chloride. Substantially any temperature may be used at which complete fusion of the anhydrous aluminum chloride can be obtained. We have found that particularly good results can be obtained by introducing the hydrogen chloride into the autoclave containing the aluminum chloride under a pressure of 150 to 750 pounds per square inch and thereafter heating to a temperature of 200 to 350° C. Upon heating the hydrogen chloride pressure increases materially and fusion of the aluminum chloride is readily obtained without substantial sublimation. The aluminum chloride may advantageously be maintained in the fused state for about 15 to 30 minutes. During this period the pressure in the vessel normally drops due to the taking up of hydrogen chloride by the fused aluminum chloride.

The fused aluminum chloride containing hydrogen chloride is then solidified by cooling while being maintained under pressure of hydrogen chloride. Thus the solidified product obtained contains substantial amounts of hydrogen chloride. After the product is solidified the hydrogen chloride pressure may be released. It is desirable, however, to maintain an inert dry atmosphere in contact with the solid aluminum chloride-hydrogen chloride product to prevent hydration of the aluminum chloride. The solidified fused aluminum chloride-hydrogen chloride product may be broken up into any suitable particle size for use.

The amount of hydrogen chloride contained in the solidified fused aluminum chloride thus obtained will vary with the temperature and pressure at which the fusion is carried out. Both higher temperature and higher pressure tend to increase the amount of hydrogen chloride taken up. For example, at a temperature of 225° C. in a bomb under an atmosphere of hydrogen chloride introduced to a pressure of about 270 pounds per square inch, a product having a molecular ratio $AlCl_3:HCl$ of about 14 or 15 to 1 was obtained. At the same temperature under hydrogen chloride introduced to a pressure of 550 pounds per square inch a product having a molecular ratio of aluminum chloride to hydrogen chloride of about 9:1 was obtained. A product obtained at a higher temperature of 325° C. under an atmosphere of hydrogen chloride introduced to a pressure of 270 pounds per square inch had a molecular ratio of about 7:1. With higher temperatures and pressures even lower molecular ratios can be obtained in the product.

All of these products, even those in which the amount of hydrogen chloride is relatively low, possess desirable properties for use as an improved catalyst in the reforming of hydrocarbons such as petroleum hydrocarbons. With higher contents of hydrogen chloride the anti-sludge characteristics of the catalysts are substantially increased. Furthermore, the structural characteristics of these aluminum chloride-hydrogen chloride catalysts are quite good and in lump form we have found in certain cases they possess crushing strengths resistant to pressures as high as 1400 pounds per square inch so that they are usable in lump form in relatively deep catalyst beds without danger of crushing and consequent clogging of the bed. These structural properties are retained by the lump catalyst even when the relative content of hydrogen chloride is quite high.

This solid aluminum chloride-hydrogen chloride product is useful in substantially any of the processes in which solid aluminum chloride or aluminum chloride supported on a carrier or adsorbent has heretofore been used. Because of its resistance to sludge formation it is particularly useful in the treatment of petroleum hydrocarbons, for example, as a catalyst in cracking, isomerization, alkylation and other petroleum hydrocarbon reforming processes. The presence of the hydrogen chloride in the catalyst apparently affects the catalyst properties of the aluminum chloride primarily by lowering slightly its catalytic activity. In those processes in which it has been customary to use hydrogen chloride as a promoter for an aluminum chloride catalyst it is desirable that such a promoter be used with the catalyst of our invention. The hydrogen chloride contained in the solid aluminum chloride catalyst of our invention does not act as a substitute for a hydrogen chloride promoter mixed with the reactants.

In the following specific example there is illustrated the preparation of a catalyst according to our invention as well as the advantageous use of this catalyst in the cracking of a petroleum hydrocarbon in comparison with lump aluminum chloride fused under its own vapor pressure in the absence of hydrogen chloride.

To a steel bomb there were charged 1350 parts by weight of anhydrous aluminum chloride. The bomb was closed and anhydrous hydrogen chloride was introduced to a pressure of 270 pounds per square inch, corresponding to 78 parts by weight of hydrogen chloride. The bomb was then sealed and heated to about 240° C., at which temperature the total pressure was 430 pounds per square inch. The bomb was maintained at this temperature for about 15 minutes during which a gradual drop in pressure was observed. After cooling to room temperature it was found that the aluminum chloride had taken up about 23 parts by weight of hydrogen chloride yielding a product having a molecular ratio of aluminum chloride to hydrogen chloride of approximately 15:1. This product was broken up and sized to ¼ to ½ inch mesh lumps.

This catalyst was then placed in a steam jacketed reaction tube and n-pentane mixed with about 7.5 mol per cent hydrogen chloride was passed over it in the vapor phase.

In a comparison test n-pentane in corresponding amount was passed in the vapor phase under the same conditions, through a bed of lump aluminum chloride which had been fused under its own vapor pressure and after about 15 minutes heating, cooled and solidified.

The results of these tests are shown in the following table:

| Type of catalyst | Fused with HCl | Fused without HCl |
| --- | --- | --- |
| Catalyst_____parts by weight____ | 100.1 | 100.0 |
| Pentane throughput_____do_____ | 160.0 | 160.0 |
| Hydrogen chloride_____mol per cent___ | 7.5 | 7.5 |
| Liquid space velocity_____ | 0.37 | 0.37 |
| Sludge_____parts by weight____ | 3.8 | 12.4 |
| Product: | | |
| Butanes—mol per cent_____ | 31.7 | 39.3 |
| Pentanes_____do_____ | 65.3 | 58.0 |
| Hexanes_____do_____ | 3.0 | 2.7 |

As will be seen from this table the activity of the aluminum chloride catalyst containing hydrogen chloride, as measured by the amount of cracking to butanes, is somewhat lower than that of the catalyst containing no hydrogen chloride. On the other hand, the amount of sludge formed is greatly reduced. Thus while butane formation was reduced from about 39 to 32 per cent, the sludge formation was reduced to about one-third of its previous value.

While our invention has been described herein with respect to certain specific embodiments thereof by way of illustration, it is to be understood that the invention is not limited to the details of such specific embodiments except as hereinafter defined in the appended claims.

What is claimed is:

1. A prepared catalyst having low sludge forming characteristics and adapted to be used in the solid state comprising small lumps of high crushing strength of aluminum chloride which has been fused and is substantially free of any carrier and is uniformly impregnated with hydrogen chloride in a ratio of aluminum chloride to hydrogen chloride between 15:1 and 7:1.

2. A method of producing a catalyst of high crushing strength and low sludge forming characteristics comprising subjecting aluminum chloride substantially free of any carrier to contact with an amount of hydrogen chloride at a pressure of from 150 to 750 pounds per square inch and a temperature of 200° to 350° C. for a period of from 15 to 30 minutes so that the ratio of aluminum chloride to hydrogen chloride is between 15:1 and 7:1, cooling and breaking the material up into small lumps.

3. A method of producing a catalyst of high crushing strength and low sludge forming characteristics comprising subjecting aluminum chloride substantially free of any carrier to contact only with an amount of hydrogen chloride at a pressure of 270 pounds per square inch and a temperature of 240° C. for a period of 15 minutes, so that the ratio of aluminum chloride to hydrogen chloride is about 15:1, cooling, and breaking the material up into lumps of ¼ to ½ inch mesh.

CHARLES W. MONTGOMERY.
NORMAN W. FRANKE.